US008843001B2

(12) United States Patent
Nagase (10) Patent No.: US 8,843,001 B2
(45) Date of Patent: Sep. 23, 2014

(54) OPTICAL TRANSMITTER AND OPTICAL TRANSMISSION APPARATUS

(75) Inventor: Ryoji Nagase, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 17 days.

(21) Appl. No.: 13/284,918

(22) Filed: Oct. 30, 2011

(65) Prior Publication Data

US 2012/0106979 A1 May 3, 2012

(30) Foreign Application Priority Data

Nov. 2, 2010 (JP) ................................ 2010-246407

(51) Int. Cl.
*H04B 10/04* (2006.01)
(52) U.S. Cl.
USPC ............ 398/201; 398/182; 398/198; 359/237
(58) Field of Classification Search
None
See application file for complete search history.

(56) References Cited

U.S. PATENT DOCUMENTS

| | | | |
|---|---|---|---|
| 5,317,439 A | 5/1994 | Fatehi et al. | |
| 2005/0254743 A1* | 11/2005 | Akiyama et al. | 385/3 |
| 2006/0088322 A1* | 4/2006 | Kobayashi et al. | 398/198 |

FOREIGN PATENT DOCUMENTS

| | | |
|---|---|---|
| JP | 06-232721 A | 8/1994 |
| JP | 2000-089181 | 3/2000 |
| JP | 2001-083473 A | 3/2001 |
| JP | 2001-308793 | 11/2001 |

OTHER PUBLICATIONS

JPOA—Office Action mailed Jun. 17, 2014 issued for corresponding Japanese Application No. 2010-246407 with English-language translation.

* cited by examiner

*Primary Examiner* — Ken Vanderpuye
*Assistant Examiner* — Merlin Brito Peguero
(74) *Attorney, Agent, or Firm* — Fujitsu Patent Center (57) ABSTRACT

An optical transmitter is disclosed. An optical modulator outputs an optical signal by modulating light being input, and has an optical absorption characteristic which changes a degree of optical absorption depending on a bias voltage being applied and includes a first characteristic region and a second characteristic region in which the degree of the optical absorption is greater than the first characteristic region. An power source applies an electric field generated by applying a predetermined shutdown bias voltage corresponding to the second characteristic region to electrodes provided in two interference optical guides formed in the optical modulator, when an output of the optical signal from the optical modulator is shut down to be less than or equal to a desired amount.

10 Claims, 4 Drawing Sheets

OPTICAL TRANSMITTER AND OPTICAL TRANSMISSION APPARATUS

CROSS-REFERENCE TO RELATED APPLICATIONS

This patent application is based upon and claims the benefit of priority of the prior Japanese Patent Application No. 2010-246407 filed on Nov. 2, 2010, the entire contents of which are incorporated herein by reference.

FIELD

A certain aspect of the embodiments discussed herein is related to an optical transmitter for outputting an optical signal, and an optical transmission apparatus including the optical transmitter.

BACKGROUND

In an optical communication field, an optical transmitter, which outputs an optical signal by modulating light in response to data to be transmitted, is used. In order to emit the optical signal being modulated, the optical transmitter includes a light source for emitting light, a light modulator for modulating light, and the like. The light transmitter is used for an optical transmission apparatus or the like for WDM (Wavelength Division Multiplexing) using multiple wavelength channels. The optical transmission apparatus for the WDM may include multiple optical transmitters for outputting optical signals each having a different wavelength, and an optical multiplexer for outputting a WDM optical signal in which multiple different optical signals output from the optical transmitter are multiplexed.

Japanese Laid-open Patent Publication No. 2001-83473 discloses a light modulator in which a optical waveguide for conducting light modulation is set so that an electric field which causes absorption of the electric field is smaller than an off-electric field of a modulation by a refractive index control, thereby an operation voltage is further decreased.

Also, Japanese Laid-open Patent Publication No. 06-232721 discloses a method and a device for monitoring optical switching node performance. A low-frequency signal is modulated on a light signal propagated along an optical transmission line at the input of an optical module. Optical modulation is carried out by adding a modulation voltage to a control voltage applied to the control electrode of a switching node in the optical module. The frequency is so selected sufficiently outside the bandwidth of a main light signal transmitted along the optical path. The amplitude of the modulated voltage is held minimum so that the level of the modulated light signal does not fluctuate so much. Consequently, it is guaranteed that information carried with the main light signal is neither destroyed nor disturbed.

SUMMARY

According to an aspect of the embodiment an optical transmitter includes an optical modulator configured to output an optical signal by modulating light being input, and to have an optical absorption characteristic which changes a degree of optical absorption depending on a bias voltage being applied and includes a first characteristic region and a second characteristic region in which the degree of the optical absorption is greater than the first characteristic region; and an power source configured to apply an electric field generated by applying a predetermined shutdown bias voltage corresponding to the second characteristic region to electrodes provided in two interference optical guides formed in the optical modulator, when an output of the optical signal from the optical modulator is shut down to be less than or equal to a desired amount.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

DESCRIPTION OF EMBODIMENTS

As described previously, an optical transmitter may include a light modulator. A Mach-Zehnder type optical modulator, which has a higher extinction ratio and a stronger tolerance of noise accompanied with multistage repeatings, may be used as the light modulator. The Mach-Zehnder type optical modulator may be produced by using a material, so-called Lithium Niobate (LN).

On the other hand, it is preferable for the optical transmitter to include an optical shutdown function capable of stopping an output of the optical signal due to a specification or during a time requested by a user (that is, shutting down more than a desired output amount of the optical signal). In the optical transmitter (hereinafter, appropriately called "LN optical modulator") including the Mach-Zehnder type optical modulator produced by using Lithium Niobate, a predetermined voltage is applied to either one or both of two arms (that is, two light guides) of the LN optical modulator, so that a light phase lag is 180° between the two arms. As a result, since light passed from one arm and light passed from another arm interfere with each other when being superimposed after passing those arms, the output of the optical signal from the optical transmitter is stopped.

As described above, recently, instead of the LN optical modulator, a Mach-Zehnder type optical modulator (hereinafter, appropriately called "semiconductor MZ type optical modulator") produced by using a semiconductor material may be used. In the semiconductor MZ modulator, it is also preferable to include the above-described optical shutdown function. However, in a case where the above-described optical shutdown function to be used for the LN optical modulator is simply applied to the semiconductor MZ modulator, a sufficient extinction amount may not be acquired. That is, it is not possible to acquire a sufficient extinction ratio by simply shifting the light phase between two arms. In detail, a light amount from one arm may not be the same as that from another arm in the semiconductor MZ modulator due to a structural or characteristic difference between the LN optical modulator and the semiconductor MZ modulator. Accordingly, when the light from one arm is superimposed with the light from another arm, the lights do not completely undergo extinction, and the sufficient extinction amount may not be acquired compared with the LN optical modulator. As a result, it is difficult or impossible to shut down light more than a desired light amount. The desired light amount may be lower than −30 dBm. The semiconductor MZ modulator of negative chirping noticeably tends to cause this problem.

Preferred embodiments of the present invention will be described with reference to accompanying drawings.

(1) Optical Transmission System

Figure 1:
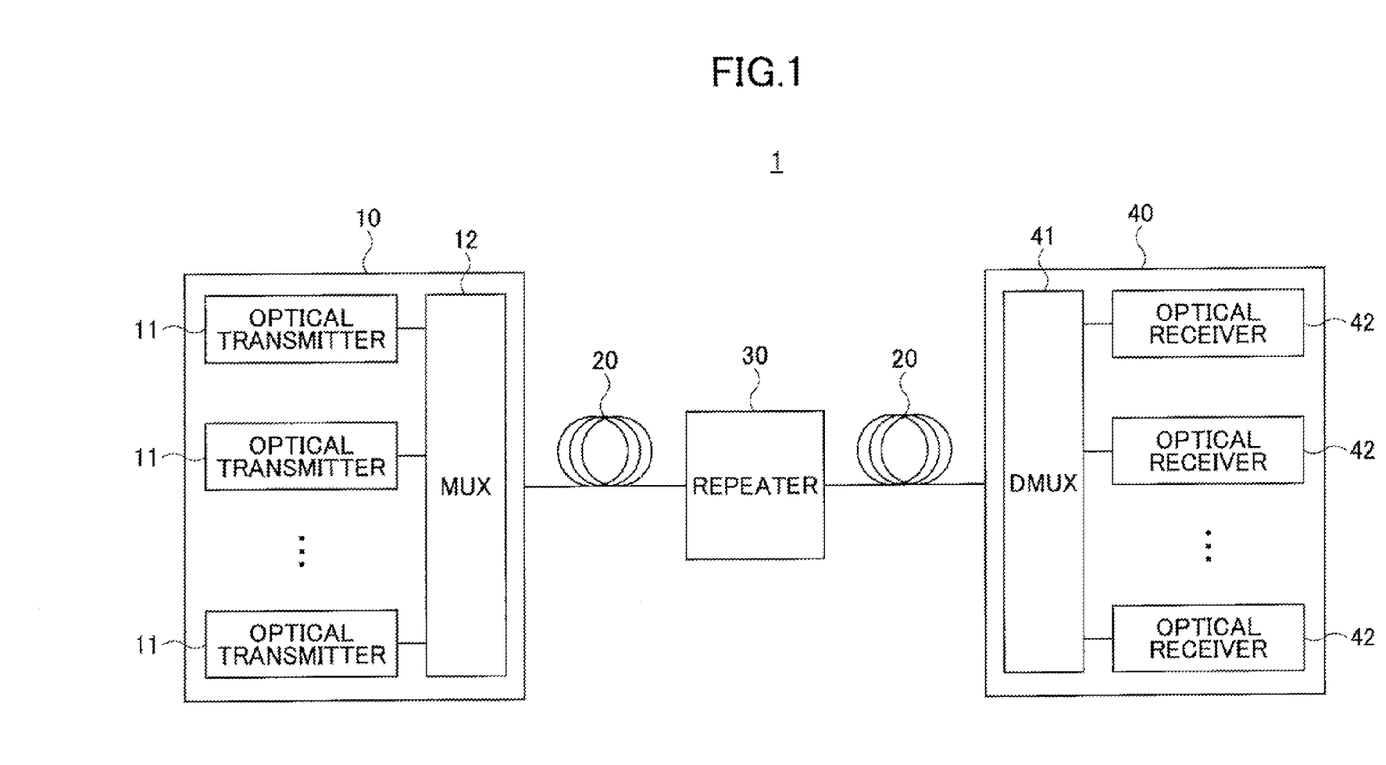
FIG. 1 is a block diagram illustrating a configuration of an optical transmission system according to an embodiment.

An optical transmission system 1 according to an embodiment will be described with reference to FIG. 1. FIG. 1 is a block diagram illustrating a configuration example of the optical transmission system 1 according to the embodiment.

As illustrated in FIG. 1, the optical transmission system 1 includes an optical transmission apparatus 10 which outputs a WDM (Wavelength Division Multiplexing) optical signal, an optical fiber transmission channel 20 which transmits the WDM optical signal output from the optical transmission apparatus 10, and an optical transmission apparatus 40 which receives the WDM optical signal transmitted via the optical fiber transmission channel 20.

The optical transmission apparatus 10 includes multiple optical transmitters 11, and an optical multiplexer (MUX) 12. The optical transmitters 11 are coupled to respective input ports of the optical multiplexer 12. An output port of the optical multiplexer 12 is coupled to the optical fiber transmission channel 20. The optical multiplexer 12 divides and multiplexes wavelengths of multiple optical signals supplied from the optical transmitters 11, and outputs the WDM optical signal.

An optical repeater 30 is provided to compensate for attenuation of the WDM optical signal in the optical fiber transmission channel 20 in the middle of the optical fiber transmission channel 20. The optical repeater 30 includes an optical amplifier which amplifies the WDM optical signal. The optical amplifier may include an optical amplification medium which receives the WDM optical signal, and a pumping part which carries out pumping of the optical amplification medium, for the optical amplification medium to provide a gain band including a band of the WDM optical signal. The optical amplification medium may be a doped fiber, a semiconductor chip, or the like in which a rare-earth element is doped The optical transmission apparatus 40 includes an optical demultiplexer (DMUX) 41 which divides the received WDM optical signal into optical signals respective to channels, and multiple optical receivers 42 which receive the divided optical signals, respectively.

Instead of outputting the WDM optical signal, the optical transmission apparatus 10 may output the optical signals without dividing and multiplexing the wavelengths of the optical signals output from the optical transmitters 11. In this case, the optical transmission apparatus 10 may not include the optical multiplexer 12, and may not include more than one optical transmitter 11. Similarly, instead of receiving the WDM optical signal, the optical transmission apparatus 40 may receive an optical signal in which the wavelength are not divided and multiplexed. In this case, the optical transmission apparatus 40 may not include the optical demultiplexer 41, and may not include more than one optical receiver 42.

(2) Optical Transmitter

Figure 2:
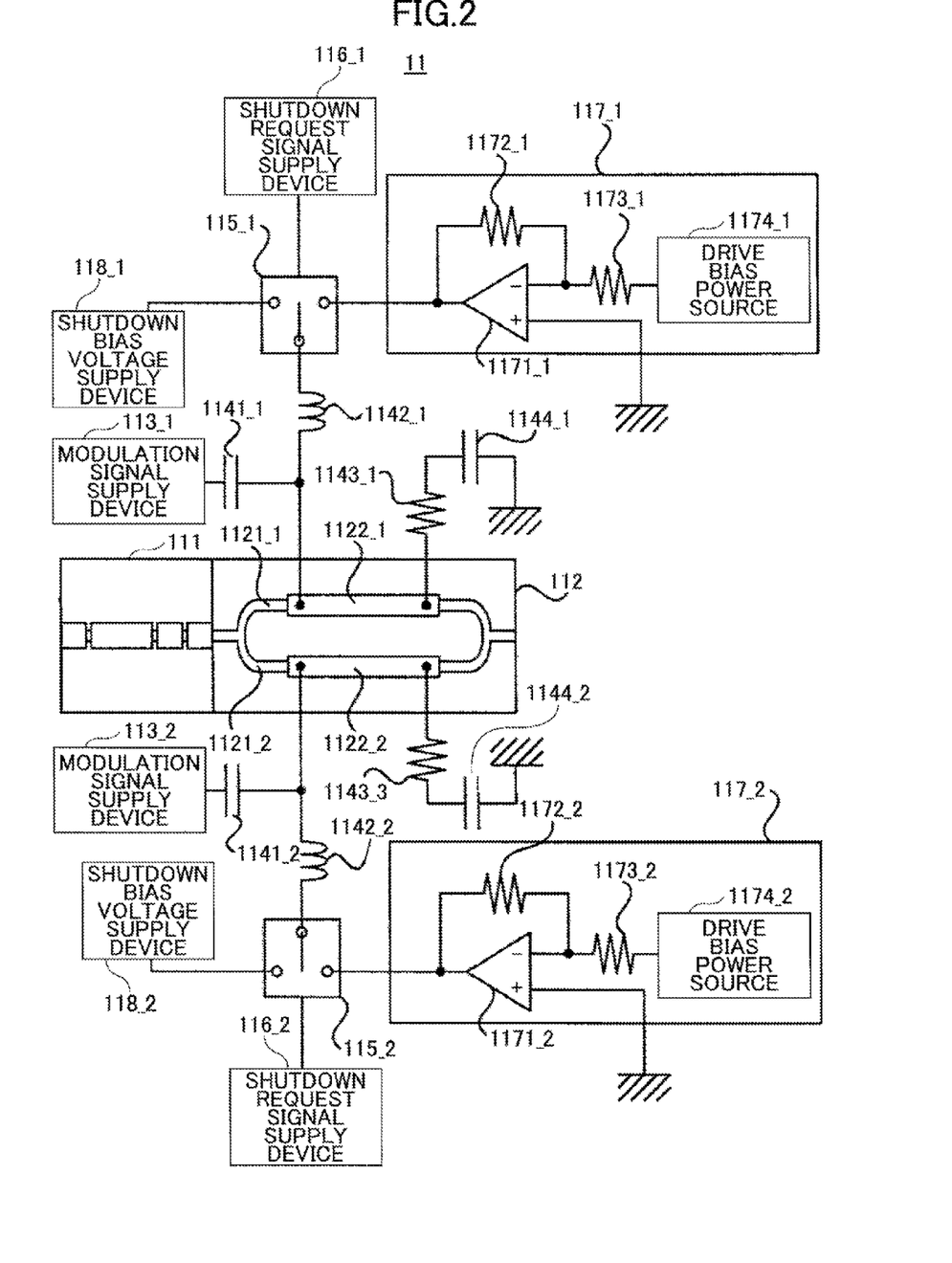
FIG. 2 is a schematic block diagram illustrating a configuration of an optical transmitter in the embodiment.

The optical transmitter 11 in the embodiment will be described with reference to FIG. 2. FIG. 2 is a schematic block diagram illustrating an example of a configuration of the optical transmitter 11 in the embodiment.

As illustrated in FIG. 2, the optical transmitter 11 includes a laser diode element 111, and an optical modulator 112. FIG. 2 illustrates a configuration in which the laser diode element 111 and the optical modulator 112 are formed on the same substrate. Alternatively, the laser diode element 111 and the optical modulator 112 may be formed on separate substrates.

The laser diode element 111 may be regarded as an example of a "light source". By receiving a supply of a driving current (which may be a 100 mA driving current), the laser diode element 111 outputs light of a desired wavelength. The laser diode element 111 outputs light toward the optical modulator 112 positioned at a right side of the laser diode element 111 in FIG. 2.

The optical modulator 112 modulates the light output from the laser diode element 111. Light to be modulated is not limited to the light output from the laser diode element 111, and may be any light input to the optical modulator 112. The optical modulator 112 outputs modulated light as an optical light. In the embodiment, a Mach-Zehnder type optical modulator, which is made from a semiconductor material, is preferable for the optical modulator 112.

The optical modulator 112 includes two light guides 1121_1 and 1121_2 which are regarded as light paths for light output from the laser diode element 111. Accordingly, the light output from the laser diode element 111 is modulated in a state of being separated into light propagating through the light guide 1121_1 and light propagating through the light guide 1121_2. After that, the light propagating through the light guide 1121_1 and the light propagating through the light guide 1121_2 are mixed, thereby the modulated light is output toward the right side of the optical modulator 112 in FIG. 2 as the optical signal.

The optical transmitter 11 modulates the light propagating through the light guide 1121_1 with the light propagating through the light guide 1121_2, and outputs modulated light as the optical signal (that is, does not shut down more than predetermined amounts of the light propagating through the light guide 1121_1 and the light propagating through the light guide 1121_2). Accordingly, the modulated signal and a drive bias voltage signal are applied to the light guides 1121_1 and 1121_2, respectively. On the other hand, the optical transmitter 11 stops outputting the optical signal from the optical modulator 112 (that is, the light propagating through the light guide 1121_1 and the light propagating through the light guide 1121_2 are shut down for the predetermined amount). A shutdown bias voltage signal is applied to the light guides 1121_1 and 1121_2.

In detail, as components for modulating or shutting down the light propagating through the light guide 1121_1 at an upper side in the optical modulator 112, the optical transmitter 11 includes an electrode 1122_1, a modulation signal supply device 113_1, a bypass capacitor 1141_1, a coil 1142_1, a resistor 1143_1, a bypass capacitor 1144_1, a switch 115_1, a shutdown request signal supply device 116_1, a drive bias voltage supply device 117_1, and a shutdown bias voltage supply device 118_1. The drive bias voltage supply device 117_1 includes a differential amplifier 1171_1, a resistor 1172_1, a resistor 1173_1, and a drive bias power source 1174_1.

In a case of modulating the light propagating through the light guide 1121_1 and outputting the optical signal, a drive voltage signal is applied to the light guide 1121_1 via the electrode 1122_1. In the drive voltage signal, a modulation signal supplied from the modulation signal supply device 113_1 is superimposed with the drive bias voltage signal supplied from the drive bias voltage supply device 117_1. Accordingly, it is preferable to provide the electrode 1122_1 so as to place on the light guide 1121_1 or so as to cover the light guide 1121_1. One terminal of the electrode 1122_1 is electrically coupled to the bypass capacitor 1141_1 and the coil 1142_1. Another terminal of the electrode 1122_1 is grounded via the resistor 1143_1 and the bypass capacitor 1144_1.

The modulation signal supply device 113_1 generates a signal modulated corresponding to data to be sent. A differential precoder may be used as the modulation signal supply device 113_1. In this case, the modulation signal supply device 113_1 may conduct a coding process in which different information between a code prior to one bit and a current code is reflected, based on the data to be sent. A 1.5 Vpp modulation signal (that is, an electric differential modulation signal) may be generated. Also, the modulation signal supply device 113_1 may be a precoder other than the differential precoder or a signal generator. The modulation signal supply device 113_1 applies the generated modulation signal to the electrode 1122_1 through the bypass capacitor 1141_1. The coil 1142_1, which is provided between the bypass capacitor 1141_1 and the switch 115_1 (that is, between the electrode 1122_1 and the switch 115_1), suppresses supplying the modulation signal.

The drive bias power source 1174_1, which is provided in the drive bias voltage supply device 117_1, supplies the drive bias voltage signal before amplification, to a negative phase input terminal of the differential amplifier 1171_1 via the resistor 1173_1. A positive phase input terminal of the differential amplifier 1171_1 is grounded. An output of the differential amplifier 1171_1 is negatively fed back to the negative phase input terminal through the resistor 1172_1. Accordingly, the drive bias voltage signal, which is amplified, is output from the differential amplifier 1171_1. In the following, in a case in which a particular notation, the "drive bias voltage signal" indicates a drive bias signal output from the differential amplifier 1171_1 (that is, the drive bias voltage signal output from the differential amplifier 1171_1). The drive bias voltage signal output from the differential amplifier 1171_1 is applied to the electrode 1122_1 via the switch 115_1 and the coil 1142_1.

On the other hand, in a case of shutting down the light propagating through the light guide 1121_1, a shutdown bias voltage signal supplied from the shutdown bias voltage supply device 118_1 is applied to the light guide 1121_1 through the electrode 1122_1. That is, the shutdown bias voltage supply device 118_1 applies the shutdown bias voltage signal to the electrode 1122_1 through the switch 115_1 and the coil 1142_1. In a case of shutting down the light propagating through the light guide 1121_1, the modulation signal supplied from the modulation signal supply device 113_1 may be or may not be applied to the light guide 1121_1 via the electrode 1122_1. In the following, regardless of a presence or an absence of applying the modulation signal, a signal, which is applied to the light guide 1121_1 via the electrode 1122_1 when the light propagating through the light guide 1121_1 is shut down, is called shutdown voltage signal.

The switch 115_1 switches an output thereof in response to a shutdown request signal supplied from the shutdown request signal supply device 116_1. The shutdown request signal supply device 116_1 may supply the shutdown request signal in response to an indication of a user, an operator, or the like of the optical transmission system 1 or the optical transmission apparatus 10. The shutdown request signal supply device 116_1 may supply the shutdown request signal of an OFF state in which the user, the operator, or the like does not request stopping (that is, shutting down) an output of the optical signal. The OFF state is regarded as a state in which a stop or shutdown of outputting the optical signal is not requested. On the other hand, The shutdown request signal supply device 116_1 may supply the shutdown request signal of an ON state in which the user, the operator, or the like requests stopping (that is, shutting down) the output of the optical signal. The ON state is regarded as a state in which a stop or shutdown of outputting the optical signal is requested. The shutdown request signal supply device 116_1 may supply the shutdown request signal in an apparatus state or a communication state of the optical transmission system 1 or the optical transmission apparatus 10. The shutdown request signal supply device 116_1 may supply the shutdown request signal of the OFF state in a case in which communication is normally or stably conducted in the apparatus state or the communication state. On the other hand, the shutdown request signal supply device 116_1 may supply the shutdown request signal of the ON state in which the communication may not be normally or stably conducted in the apparatus state or the communication state.

FIG. 2 illustrates a case in which the shutdown request signal is supplied with respect to the switch 115_1 from the shutdown request signal supply device 116_1 and the shutdown request signal is supplied with respect to a switch 115_2 from a shutdown request signal supply device 116_2. However, the shutdown request signal may be supplied to the switches 115_1 and 115_2 from a single shutdown request signal supply device 116. In this case, the optical transmitter 11 may include the single shutdown request signal supply device 116, instead of the shutdown request signal supply devices 116_1 and 116_2.

In a case in which the shutdown request signal indicates the OFF state, the switch 115_1 electrically connects the drive bias voltage supply device 117_1 with the coil 1142_1. That is, the switch 115_1 switches one terminal for the drive bias voltage supply device 117_1. On the other hand, in a case in which the shutdown request signal is in the ON state, the switch 115_1 electrically connects the shutdown bias voltage supply device 118_1 and the coil 1142_1. That is, the switch 115_1 switches another terminal for the shutdown bias voltage supply device. It is preferable to use a semiconductor analog switch or the like including a CMOS (Complementary Metal Oxide Semiconductor) capable of switching at relatively high speed, as the switch 115_1. As the switch 115_1, a switch other than a reaction analog switch including the CMOS or the like may be used.

On the other hand, as components for modulating or shutting down the light propagating through the light guide 1121_2 at a lower side in the optical modulator 112, the optical modulator 112 includes an electrode 1122_2, a modulation signal supply device 113_2, a bypass capacitor 1141_2, a coil 1142_2, a resistor 1143_2, a bypass capacitor 1144_2, the switch 115_2, a shutdown request signal supply device 116_2, a drive voltage supply device 117_2, and a shutdown bias voltage supply device 118_2. The drive bias voltage supply device 117_2 includes a differential amplifier 1171_2, a resistor 1172_2, a resistor 1173_2, and a drive bias power source 1174_2. In the optical modulator 112, an operation of components for modulating or shutting down the light propagating through the light guide 1121_2 at the lower side is a similar operation of the components for modulating or shutting down the light propagating through the light guide 1121_1 at the upper side, and an explanation thereof will be omitted.

Figure 3:
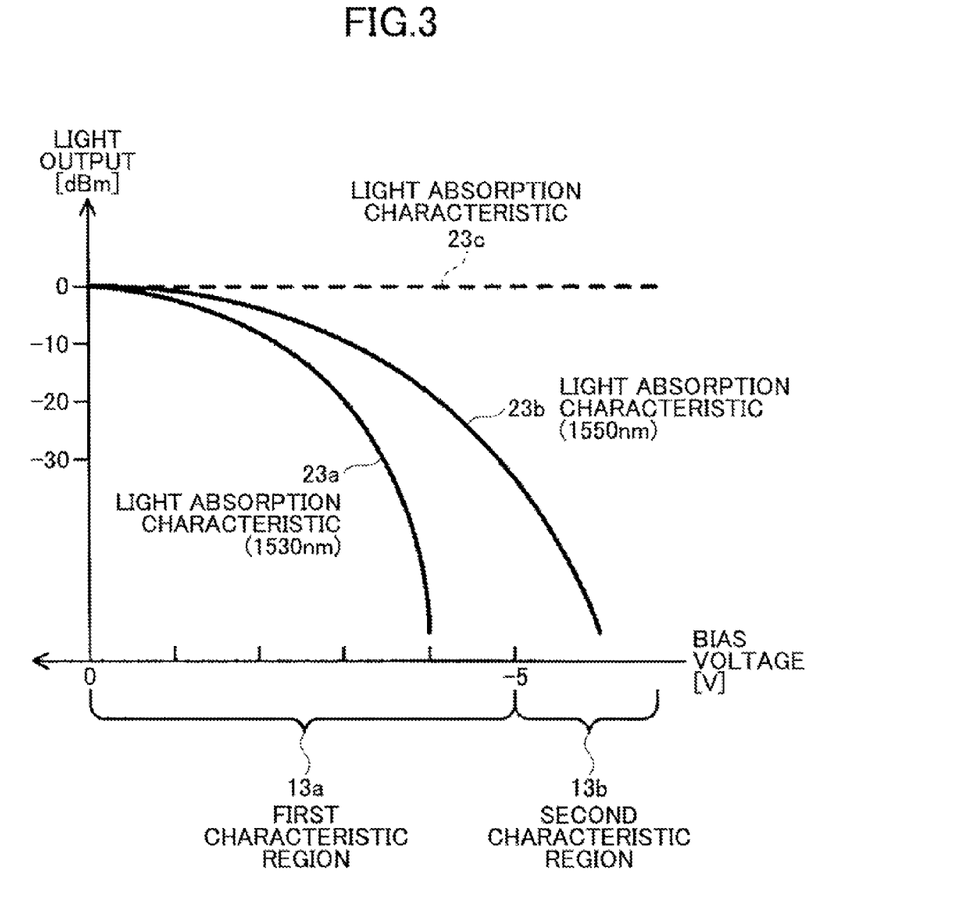
FIG. 3 is a graph illustrating light absorption characteristics of an optical modulator in the embodiment, and a light absorption characteristic of a comparative optical modulator.

In the embodiment, a light absorption characteristic of the optical modulator 112 (that is, the Mach-Zehnder type optical modulator made from a semiconductor material) is considered, and the above-described drive voltage signal and shutdown voltage signal are set. In the following, referring to FIG. 3, the drive voltage signal and the shutdown voltage signal will be described as well as the light absorption characteristic of the optical modulator 112. In FIG. 3, a graph indicates light absorption characteristics 23a and 23b of the optical modulator 112 of the embodiment and light absorption characteristic 23c of a comparative optical modulator. A degree of light absorption may be denoted by a physical quantity such as a photon quantity, light energy, a luminous intensity, luminance, or the like.

As illustrated in FIG. 3, the optical modulator 112 of the embodiment includes the light absorption characteristics 23a and 23b in which the degree of the light absorption changes in response to a bias voltage (that is, a voltage of the drive bias voltage signal or a voltage of the shutdown bias voltage signal) which applies to the light guides 1121_1 and 1121_2. In detail, the optical modulator 112 of the embodiment has the light absorption characteristics 23a and 23b in which the smaller the bias voltage to be applied to the light guides 1121_1 and 1121_2 is, the greater the degree of the light absorption is (that is, a light output becomes smaller). That is, the optical modulator 112 of the embodiment has the light absorption characteristics 23a and 23b in which the degree of the light absorption becomes greater as a bias voltage to be applied to the light guides 1121_1 and 1121_2 is greater in a negative direction (a direction toward a right side in FIG. 3). The light absorption characteristics 23a and 23b can be changed depending on a wavelength of the light propagating in the optical modulator 112. In FIG. 3, the light absorption characteristics 23a and 23b correspond to a 1530 nm wavelength and a 1550 nm wavelength of the light propagating in the optical modulator 112, respectively.

In FIG. 3, the light absorption characteristic is illustrated respectively for the light guides 1121_1 and 1121_2 included in the optical modulator 112.

On the other hand, the comparative optical modulator (in detail, the Mach-Zehnder type optical modulator produced by using Lithium Niobate) hardly changes the degree of the light absorption, regardless of fluctuation of a voltage to be applied to a light guide.

In the embodiment, the drive voltage signal is applied to the light guides 1121_1 and 1121_2. In the drive voltage, the modulation signal and the drive bias voltage signal are superimposed. However, the drive voltage signal fluctuates in response to the modulation signal in which the drive bias voltage signal is regarded as a central voltage. Accordingly, in a view of a voltage, the drive bias voltage signal can be equal to the drive voltage signal.

Similarly, in the embodiment, the shutdown voltage signal is applied to the light guides 1121_1 and 1121_2. In the shutdown voltage signal, the modulation signal and the shutdown bias voltage signal are superimposed. Otherwise, the shutdown voltage signal is regarded as the shutdown bias voltage signal itself. However, the shutdown voltage signal represents a voltage signal fluctuating in response to the modulation signal in which the shutdown bias voltage signal is regarded as the central voltage. Alternatively, the shutdown voltage signal represents the shutdown bias voltage signal itself. Accordingly, in the view of the voltage, the shutdown bias voltage signal can be equal to the shutdown voltage signal.

Considering the light absorption characteristic of the optical modulator 112, in a case in which the light propagating through the light guide 1121_1 and the light propagating through the light guide 1121_2 are modulated and are output as the optical signal, it is preferable to use a characteristic region (which may be regarded as a first characteristic region in FIG. 3) in which the degree of the light absorption is relatively smaller (the light absorption may not be realized less than approximately −30 dBm). That is, it is preferable to use a characteristic region in which the degree of the light absorption is relatively smaller. That is, it is preferable to set the drive bias voltage signal so as to locate an operation point of the optical modulator 112 in the characteristic region in which the degree of the light absorption is relatively smaller. Considering the light absorption characteristics 23a and 23b illustrated in FIG. 3, the drive bias voltage signal may be set in a range from 0 V to −5 V (preferably, −1 V to −3 V). Accordingly, if the differential amplifiers 1171_1 and 1171_2 indicate gains "10", respectively, as the drive bias voltage signal before being amplified, it is preferable to output the voltage signal in a range from 0 V to 0.5 V (preferably, 0.1 V to 0.3 V). In this case, since the degree of the light absorption of the optical modulator 112 is relatively smaller, the light propagating through the light guide 1121_1 and the light propagating through the light guides 1121_2 are hardly or less absorbed. Accordingly, the optical transmitter 11 can output the optical signal.

In a case in which the light propagating through the light guide 1121_1 and the light propagating through the light guides 1121_2 are shut down (that is, an output of the optical signal from the optical modulator 112 is stopped), it is preferable to use a characteristic region (which may be regarded as a second characteristic region 13b in FIG. 3) in which the degree of the light absorption is relatively greater (the light absorption may be realized less than or equal to approximately −30 dBm). That is, it is preferable to set the shutdown bias voltage signal so as to use the characteristic region in which the degree of the light absorption is relatively greater. That is, it is preferable to set the shutdown bias voltage signal so that the operation point of the optical modulator 112 is located on the characteristic region in which the degree of the light absorption is relatively greater. Considering the light absorption illustrated in FIG. 3, it is preferable to set the shutdown bias voltage signal to be less than or equal to −5 V (preferably, approximately −10 V). In this case, since the degree of the light absorption of the optical modulator 112 is relatively greater, the light propagating through the light guide 1121_1 and the light propagating through the light guide 1121_2 are mostly or approximately absorbed by the optical modulator 112. Accordingly, the optical transmitter 11 can stop (that is, shut down) the output of the optical signal.

In order to set the drive bias voltage signal and the shutdown bias voltage signal, a specification for the optical transmitter 11, a shutdown time for shutting down the optical signal, and the like) is considered. The specification may specify a shutdown amount for shutting down the optical signal (that is, a light absorption amount), a shutdown time for shutting down the optical signal, and the like. Then, it is preferable to adequately or suitably determine either one of the characteristic regions (which may be regarded as the first characteristic region 13a of the second characteristic region 13b) related to the light absorption characteristics of the optical modulator 112.

As described above, according to the embodiment, in the optical transmitter 11, it is possible to apply the shutdown bias voltage signal (the shutdown voltage signal), which is set by considering the light absorption characteristic of the optical modulator 112. That is, it is possible to stop outputting the optical signal from the optical transmitter 11 by using the light absorption characteristic of the optical modulator 112. Accordingly, the optical signal can be properly shut down.

As one approach (that is, one approach of a comparative example) for realizing a light shutdown function without using the light absorption characteristic of the optical modulator 112 of the embodiment, it may be regarded that the light shutdown function can be realized by stopping supply of a laser diode drive current for driving the laser diode element 111. That is, it is considered to stop the output of the optical signal by stopping outputting light itself from the laser diode element 111. However, in a case of stopping and resuming the supply of the laser diode drive current, temperature of the laser diode element 111 changes greatly. Thus, a relatively longer time is spent until light having a stable wavelength is emitted from the laser diode element 111. Consequently, in the optical transmission system 1 in which a rising time of the optical signal may be relatively shorter (that is, the optical transmission system 1 applying the WDM), an appropriate optical signal may not be output.

As another approach (that is, another approach of the comparative example) for realizing the optical shutdown function without using the light absorption characteristic of the optical modulator 112 of the embodiment, it may be regarded that a reverse bias voltage is applied with respect to a SOA (Semiconductor Optical Amplifier), with which the laser diode element 111 may be provided, thereby realizing the optical shutdown function. In this approach, the reverse bias voltage is applied in a reverse direction with respect to a bias voltage for amplifying light and attenuates the light. However, attenuation alone of the light by utilizing the SOA may not exactly shut down the light which is more than or equal to a desired amount (which may be −30 dBm).

According to the embodiment, it is possible to stop outputting the optical signal from the optical transmitter 11 by using the light absorption characteristic of the optical modulator 112 as described above. Therefore, compared with a configuration in which the optical signal is shut down by controlling a drive of the laser diode element 111, the optical signal can be appropriately shut down.

It originally has been regarded that the characteristic (the second characteristic region) used for the optical transmitter 11 of the embodiment to shut down the optical signal is not preferable to use the optical modulator 112. That is, it is preferable not to have the characteristic in which the degree of the light absorption becomes greater. In the embodiment, the characteristic, which has not been originally desired, is positively utilized. Since the optical signal can be shut down, the embodiment is practical and quite useful.

In the optical transmitter 11 according to the embodiment, it is possible to apply the drive bias voltage signal (drive voltage signal) which is set in consideration of the optical absorption characteristic of the optical modulator 112, with respect to the light guides 1121_1 and 1121_2. That is, by using the optical absorption characteristic of the optical modulator 112, the optical signal can be output from the optical transmitter 11. Accordingly, it is possible to appropriately output the optical signal.

In the optical transmitter 11 according to the embodiment, it is possible to set the shutdown bias voltage signal (the shutdown voltage signal) less than the drive bias voltage signal, in consideration of the optical absorption characteristic of the optical modulator 112. Therefore, the optical signal can be appropriately shut down and can be adequately output.

In the optical transmitter 11 according to the embodiment, the switch 115_1 and the shutdown bias voltage supply device 118_1 are provided for the light guide 1121_1 included in the optical modulator 112. Similarly, the switch 115_2 and the shutdown bias voltage supply device 118_2 are provided for the light guide 1121_2 included in the optical modulator 112. That is, in the optical transmitter 11 according to the embodiment, the switch 115_2 and the shutdown bias voltage supply device 118_2 are provided separately from the switch 115_1 and the shutdown bias voltage supply device 118_1. Accordingly, the shutdown bias voltage signal can be appropriately applied individually to the light guide 1121_1 and the light guide 1121_2 included in the optical modulator 112.

(3) Variation

Figure 4:
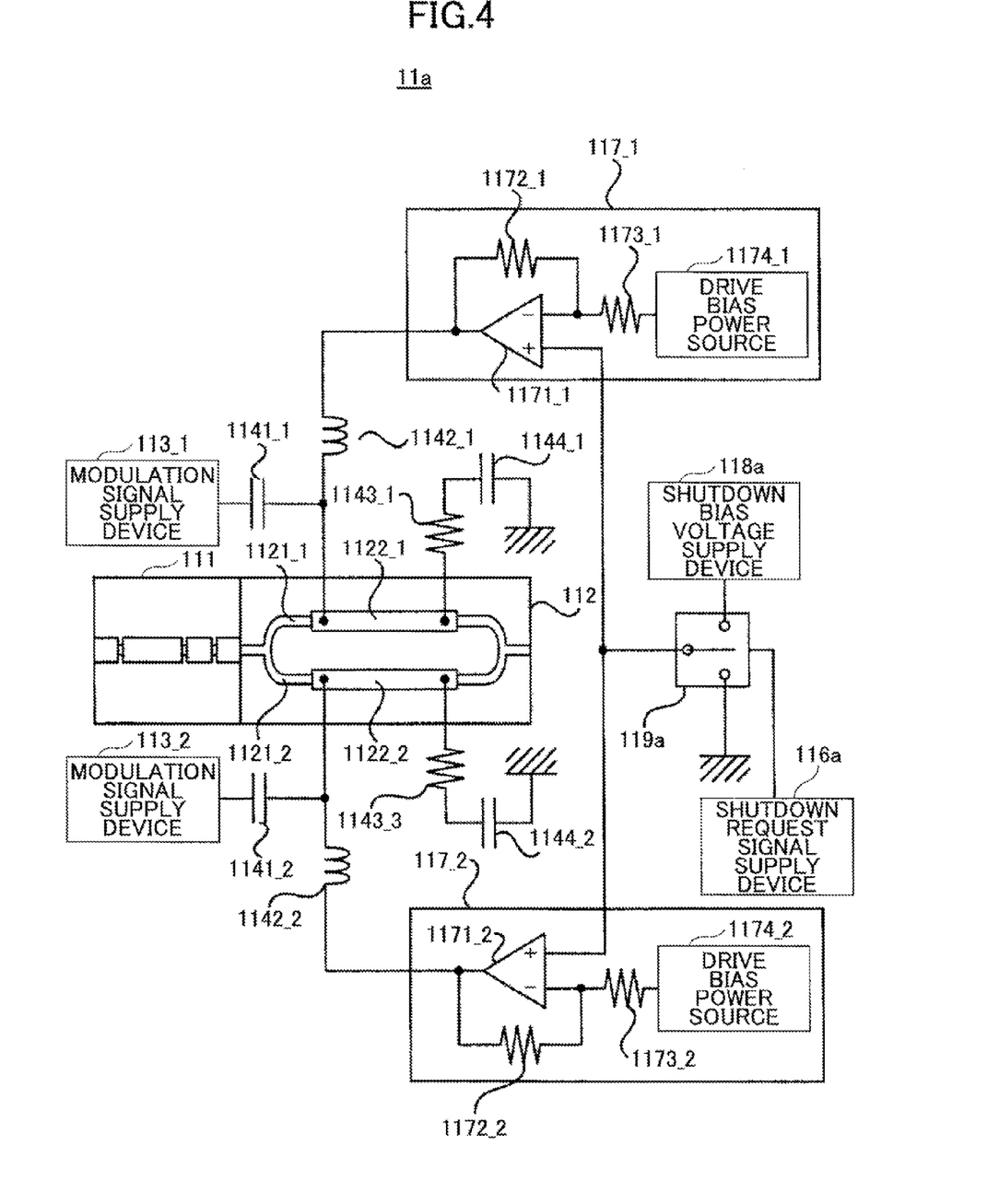
FIG. 4 is a schematic block diagram illustrating a configuration of an optical transmitter in a variation.

A variation of the optical transmitter 11 will be described with reference to FIG. 4. FIG. 4 is a schematic block diagram illustrating a configuration example of an optical transmitter 11a in the variation. In FIG. 4, components that are the same as those in FIG. 2 are indicated by the same reference numerals and the explanation thereof will be omitted.

As illustrated in FIG. 4, in the variation, the optical transmitter 11a includes the laser diode element 111, and the optical modulator 112 including the light guides 1121_1 and 1121_2. Similar to the optical transmitter 11 described above, the optical transmitter 11a includes the electrodes 1122_1 and 1122_2, the modulation signal supply devices 113_1 and 113_2, the bypass capacitors 1141_1 and 1141_2, the coils 1142_1 and 1142_2, the resistors 1143_1 and 1143_2, the bypass capacitors 1144_1 and 1144_3, and the drive bias voltage supply devices 117_1 and 117_2.

Compared with the optical transmitter 11, the switches 115_1 and 115_2 are not provided in the optical transmitter 11a. In the optical transmitter 11 in the variation, the drive bias voltage signal output from the drive voltage supply device 117_1 or 117_2 is applied to the electrode 1122_1 or 1122_2 via the coil 1142_1 or 1142_2, respectively.

Moreover, different from the optical transmitter 11 in FIG. 2, the optical transmitter 11a includes a shutdown request signal supply device 116a which is common to the light guides 1121_1 and 1121_2, instead of the shutdown request signal supply devices 116_1 and 116_2 in the optical 11 in FIG. 2. It should be noted that the shutdown request signal supply device 116a may be formed similar to the shutdown request signal supply devices 116_1 or 116_2.

Similarly, different from the optical 11 in FIG. 2, the optical transmitter 11a includes a shutdown bias voltage supply device 118a which is common to the light guides 1121_1 and 1121_2, instead of the shutdown bias voltage supply devices 118_1 and 118_2 in the optical 11 in FIG. 2.

Moreover, different from the optical 11 in FIG. 2, the optical transmitter 11a additionally includes a switch 119a for switching to connect the drive bias voltage supply device 117_1 or 117_2 to the shutdown bias voltage supply device 118a or a grounding point.

In the variation, in a case of outputting the light propagating through the light guide 1121_1 as the optical signal, a positive phase input terminal of the differential amplifier 1171_1 included in the drive bias voltage supply device 117_1 and a positive phase input terminal of the differential amplifier 1171_2 included in the drive bias voltage supply device 117_2 are grounded through the switch 119a. In detail, in a case in which the shutdown request signal supplied from the shutdown request signal supply device 116a is in the OFF state, the switch 119a is electrically coupled to the positive phase input terminals respective to the differential amplifiers 1171_1 and 1171_2 with the grounding point. That is, the switch 119a switches a terminal at a lower side in the switch 119a to be ON. As a result, the optical transmitter 11a illustrated in FIG. 4 conducts an operation similar to the optical transmitter 11 in FIG. 2 (in detail, an operation for modulating light and outputting the modulated light as the optical signal). Accordingly, the drive bias voltage, which uses the characteristic region (which may be regarded as the first characteristic region 13a in FIG. 3) having a relatively smaller degree of the optical absorption (the light absorption may not be realized from −20 dBm to −30 dBm), is output from the drive bias voltage supply devices 117_1 and 117_2.

On the other hand, in the variation, in a case of shutting down the light propagating through the light guide 1121_1, the positive phase input terminal of the differential amplifier 1171_1 included in the drive bias voltage supply device 117_1 and the positive phase input terminal of the differential amplifier 1171_2 included in the drive bias voltage supply device 117_2 are coupled to the shutdown bias voltage supply device 118a via the switch 119a. In detail, in a case in which the shutdown request signal supplied from the shutdown request signal supply device 116 is in the ON state, the switch 119a electrically connects each of the positive phase input terminals of the differential amplifiers 1171_1 and 1171_2 with the shutdown bias voltage supply device 118a. That is, the switch 119a switches a terminal at an upper side in the switch 119a in FIG. 4 to be ON.

The shutdown bias voltage supply device 118a supplies an appropriate bias voltage so that the shutdown bias voltage signal illustrated in FIG. 3 is output from the drive bias voltage supply devices 117_1 and 117_2. That is, the shutdown bias voltage supply device 118a supplies an appropriate bias voltage so that the shutdown bias voltage signal, which uses the characteristic region (which may be regarded as the second characteristic region 13b in FIG. 3) having a relatively greater degree of the optical absorption (the light absorption may be realized less than or equal to approximately −30 dBm), is output from the drive bias voltage supply devices 117_1 and 117_2.

A specific example will be described. It is assumed that the drive bias voltage signals from the drive bias power sources 1174_1 and 1174_2 are supplied to the negative phase input terminals corresponding to the differential amplifiers 1171_1 and 1171_2. In this case, it is assumed that the drive bias voltage signal is applied in a range from 0 V to −0.3 V (preferably, −0.1 V to −0.3 V). In a case in which the positive phase input terminals corresponding to the differential amplifiers 1171_1 and 1171_2 are grounded, a voltage difference between the positive phase input terminals of the differential amplifiers 1171_1 and 1171_2 is approximately 0 V to 0.3 V.

On the other hand, it is assumed that the positive phase input terminals corresponding to the differential amplifiers 1171_1 and 1171_2 are coupled to the shutdown bias voltage supply device 118a which supplies a bias voltage of approximately −2 V. In this case, the voltage difference between the positive phase input terminals of the differential amplifiers 1171_1 and 1171_2 is approximately 1.7 V to 2.0 V. That is, the voltage difference between the positive phase input terminals of the differential amplifiers 1171_1 and 1171_2 greatly increases. As a result, since outputs of the differential amplifiers 1171_1 and 1171_2 are saturated, power supply voltages are output from minus sides of the differential amplifiers 1171_1 and 1171_2. Accordingly, if the power supply voltages at the minus sides are −5 V, the shutdown bias voltage signals of approximately −5 V are output from the differential amplifiers 1171_1 and 1171_2. In consideration in that the power supply voltages at the minus sides are output, it is preferable to set the power supply voltages at the minus sides of the differential amplifiers 1171_1 and 1171_2 to be the same as a voltage signal which uses the characteristic (which may be regarded as the second characteristic region 13b in FIG. 3) having a relatively greater degree of the light absorption. As a result, the optical transmitter 11a illustrated in FIG. 4 operates (specifically, shuts down the light) similarly to the optical transmitter 11 illustrated in FIG. 2. Accordingly, the shutdown bias voltage signals, which uses the characteristic region (which may be regarded as the second characteristic region 13b) having the relatively high degree of the light absorption. Thus, the optical transmitter 11 shuts down the optical signal.

As described above, in the optical transmitter 11a in the variation, various advantages obtained in the optical transmitter 11 can be preferably acquired. In addition, in the transmitter 11a in the variation, it is possible to reduce the number of components such as the shutdown bias voltage supply device 118a, the switch 119a, and the like. Accordingly, it is possible to minimize the transmitter 11a and to reduce the cost of the transmitter 11a.

Accordingly, it is possible to provide the optical transmission apparatus 10 which transmits the optical signal output from the optical transmitter 11 or 11a to the optical transmission apparatus 40 via the optical channel 20.

The optical transmitters 11 and 11a, and the optical transmission apparatus 10 can appropriately shut down the optical signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical transmitter, comprising:
  an optical modulator configured to output an optical signal by modulating light being input, and to include two interference optical guides each having an optical absorption characteristic which changes a degree of optical absorption depending on a bias voltage being applied and includes a first characteristic region and a second characteristic region in which the degree of the optical absorption is greater than the first characteristic region; and
  a power source configured to apply an electric field generated by applying a predetermined shutdown bias voltage, which causes the degree of the optical absorption to be greater, corresponding to the second characteristic region to electrodes provided in the two interference optical guides formed in the optical modulator, when an output of the optical signal from the optical modulator is shut down to be less than or equal to a desired amount.

2. The optical transmitter as claimed in claim 1,
  wherein in the optical absorption characteristic of the optical transmitter, the degree of the optical absorption becomes greater when the bias voltage being applied becomes greater in a negative direction, and
  the shutdown bias voltage is greater in the negative direction than a drive bias voltage which corresponds to the bias voltage when the output of the optical signal from the optical modulator is not shut down to be less than or equal to the desired amount.

3. The optical transmitter as claimed in claim 2,
  wherein the drive bias voltage corresponds to the first characteristic region.

4. The optical transmitter as claimed in claim 2, wherein the power source includes:
  a shutdown power source configured to supply the shutdown bias voltage;

a drive power source configured to supply the drive bias voltage; and a switch configured to connect the shutdown power source with the electrode when the output of the optical signal from the optical modulator is shut down to be less than or equal to the desired amount, and to connect the drive power source with the electrode when the output of the optical signal from the optical modulator is shut down to be less than or equal to the desired amount.

5. The optical transmitter as claimed in claim 1, wherein the power source includes, for each of the electrodes provided in the two interference optical guides:

a shutdown power source configured to supply the shutdown bias voltage; and a switch configured to connect the shutdown power source and the electrode.

6. The optical transmitter as claimed in claim 1, wherein the power source includes:

a shutdown power source configured to supply the shutdown bias voltage; and a switch configured to connect the shutdown power source with the electrode, so that the shutdown power source and the switch are common to the electrodes provided in the two interference optical guides.

7. The optical transmitter as claimed in claim 2, further comprising:

a switch configured to switch to one of the drive bias voltage and the shutdown bias voltage based on a signal from a shutdown request signal supply device, and supply the one of the drive bias voltage and the shutdown bias voltage to the electrode.

8. An optical transmission apparatus comprising:

an optical transmitter configured to output an optical signal to be transmitted to an apparatus via an optical transmission channel, wherein the optical transmitter includes:

an optical modulator configured to output the optical signal by modulating light being input, and to include two interference optical guides each having an optical absorption characteristic which changes a degree of optical absorption depending on a bias voltage being applied and includes a first characteristic region and a second characteristic region in which the degree of the optical absorption is greater than the first characteristic region; and a power source configured to apply an electric field generated by applying a predetermined shutdown bias voltage, which causes the degree of the optical absorption to be greater, corresponding to the second characteristic region to electrodes provided in the two interference optical guides formed in the optical modulator, when an output of the optical signal from the optical modulator is shut down to be less than or equal to a desired amount.

9. The optical transmitter as claimed in claim 1, wherein the predetermined shutdown bias voltage corresponding to the second characteristic region is applied to two electrodes provided respectively in the two interference optical guides.

10. The optical transmission apparatus as claimed in claim 8, wherein the predetermined shutdown bias voltage corresponding to the second characteristic region is applied to two electrodes provided respectively in the two interference optical guides.

* * * * *